US008925469B2

(12) United States Patent
Bennie et al.

(10) Patent No.: US 8,925,469 B2
(45) Date of Patent: Jan. 6, 2015

(54) GROMMET ASSEMBLY FOR WORK SURFACES

(75) Inventors: William B. Bennie, Rockford, MI (US); Brett R. Kincaid, Ada, MI (US); Duck Young Kong, Grand Rapids, MI (US); James L. Rozema, Byron Center, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 13/699,936

(22) PCT Filed: May 26, 2011

(86) PCT No.: PCT/US2011/038114
§ 371 (c)(1),
(2) Date: Nov. 26, 2012

(87) PCT Pub. No.: WO2011/150192
PCT Pub. Date: Dec. 1, 2011

(65) Prior Publication Data
US 2013/0061783 A1     Mar. 14, 2013

Related U.S. Application Data

(60) Provisional application No. 61/349,675, filed on May 28, 2010.

(51) Int. Cl.
| *A47B 37/00* | (2006.01) |
| *A47B 13/08* | (2006.01) |
| *A47B 21/06* | (2006.01) |
| *A47B 21/00* | (2006.01) |
| *H02G 3/14* | (2006.01) |
| *H02G 3/38* | (2006.01) |

(52) U.S. Cl.
CPC ............. *A47B 13/08* (2013.01); *A47B 21/06* (2013.01); *A47B 21/00* (2013.01); *H02G 3/14* (2013.01); *H02G 3/38* (2013.01)
USPC ....................................... 108/50.02

(58) Field of Classification Search
USPC ............... 312/223.6, 223.3, 194–196, 324; 174/53; 108/50.01, 50.02, 25, 26; 49/326, 193, 382; 16/230–232, 16/DIG. 23; 220/813, 817, 812
See application file for complete search history.

(56) References Cited

U.S. PATENT DOCUMENTS

| 3,152,716 A | 10/1964 | Feldhahn |
| 4,110,552 A | 8/1978 | Lombardi |

(Continued)

FOREIGN PATENT DOCUMENTS

| DE | 3111595 | * 10/1982 |
| JP | 11-127970 A | 5/1999 |

(Continued)

OTHER PUBLICATIONS

International Search Report, Application No. US2011/038114, Feb. 9, 2012, 3 pages.

*Primary Examiner* — Janet M Wilkens
(74) *Attorney, Agent, or Firm* — Price Heneveld LLP

(57) ABSTRACT

A work surface includes a grommet and door assembly that provides for routing of utility lines through an opening in the work surface. The door pivots in first and second opposite directions about first and second axes, respectively, to first and second open positions. Magnetic connectors retain the door during pivoting about the first and second axes, and also retain the door in a closed position.

25 Claims, 11 Drawing Sheets

(56) References Cited

U.S. PATENT DOCUMENTS

| | | | |
|---|---|---|---|
| 4,721,476 A * | 1/1988 | Zeliff et al. | 439/142 |
| 4,792,881 A * | 12/1988 | Wilson et al. | 361/827 |
| 5,210,906 A | 5/1993 | Aihara et al. | |
| 5,530,992 A * | 7/1996 | Baermann | 16/231 |
| 5,647,652 A | 7/1997 | Zalewski et al. | |
| 5,675,934 A * | 10/1997 | Park | 49/193 |
| 6,003,716 A | 12/1999 | Allison et al. | |
| 6,250,729 B1 | 6/2001 | Allison et al. | |
| 6,338,301 B1 * | 1/2002 | Almond | 108/50.02 |
| 6,399,882 B1 | 6/2002 | Fulkner et al. | |
| 6,629,505 B1 * | 10/2003 | Cronk et al. | 108/50.02 |
| 6,814,244 B1 | 11/2004 | Hathcock | |
| 6,835,891 B1 | 12/2004 | Herzog et al. | |
| 7,686,364 B2 * | 3/2010 | Hehn | 296/24.34 |
| 8,013,242 B1 * | 9/2011 | Thibault et al. | 174/53 |
| 8,119,910 B1 * | 2/2012 | Golden et al. | 174/53 |
| 2005/0167138 A1 * | 8/2005 | McCarthy | 174/53 |
| 2005/0268823 A1 * | 12/2005 | Bakker et al. | 108/50.02 |

FOREIGN PATENT DOCUMENTS

| | | |
|---|---|---|
| JP | 3144050 U9 | 7/2008 |
| KR | 10-0392660 B1 | 9/2003 |
| KR | 20-0427467 Y1 | 9/2006 |

* cited by examiner

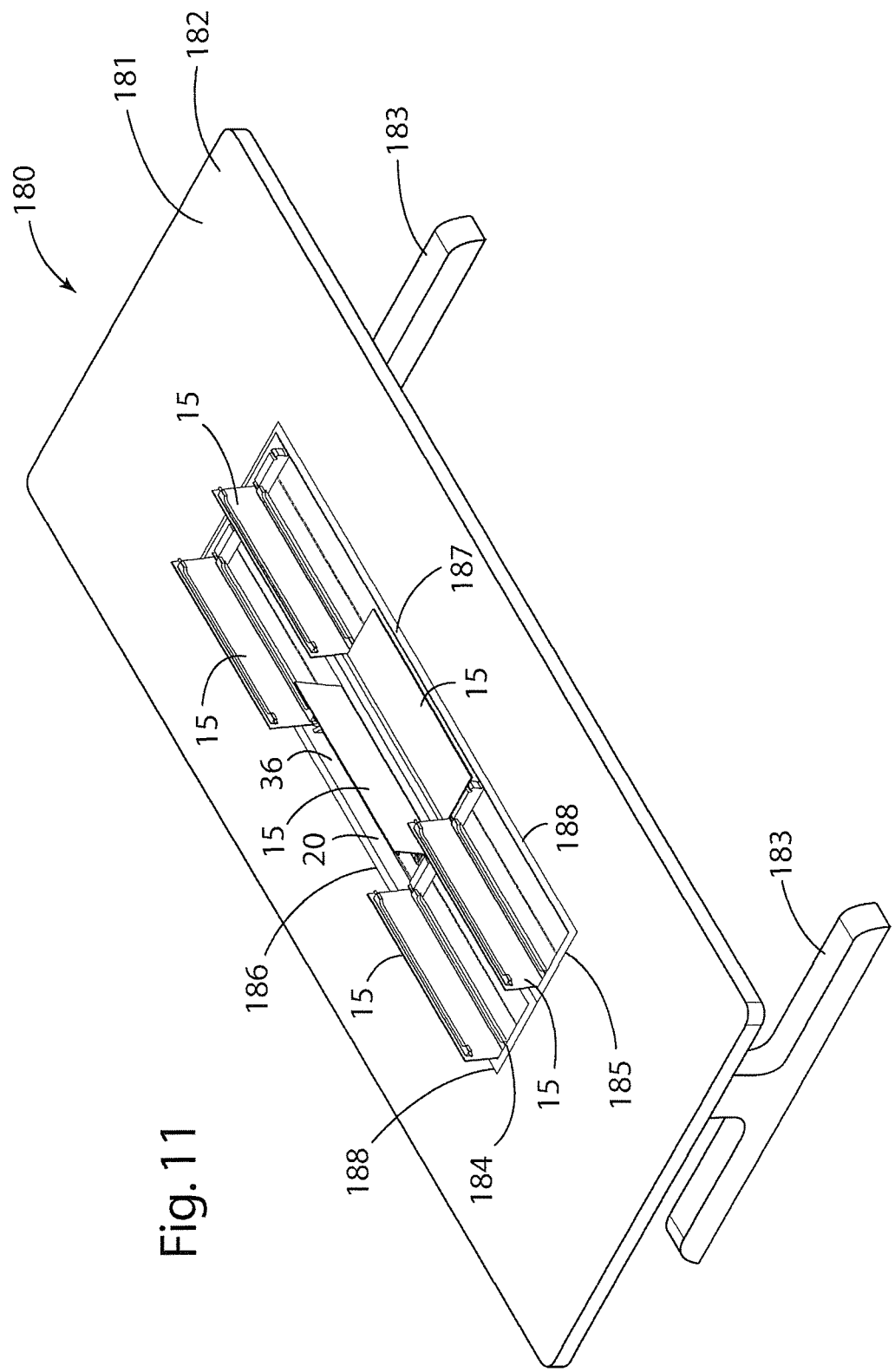

GROMMET ASSEMBLY FOR WORK SURFACES

CROSS-REFERENCE TO RELATED APPLICATION

This application is the National Stage of PCT/U.S.2011/038114, filed May 26, 2011 which claims priority to U.S. Provisional Patent Application No. 61/349,675, filed on May 28, 2010, entitled "GROMMET ASSEMBLY FOR WORK SURFACES," the entire contents of which are hereby incorporated by reference.

BACKGROUND OF THE INVENTION

Desks, work surfaces, and the like may be utilized in offices and other environments. Various power and/or data lines or other utility lines may need to be routed from below the work surface to a location above the work surface to support electrically-powered items, such as lamps, computer components, telephones, and the like. Known work surfaces may include an opening through the work surfaces through which the utility lines can be routed. However, known arrangements may suffer from various drawbacks.

SUMMARY OF THE INVENTION

One aspect of the present invention is a work surface assembly including a top having upper and lower side faces. The top defines an opening extending between the upper and lower side faces, and horizontally spaced-apart pivot surfaces. The work surface assembly also includes a door having spaced-apart first and second pivot structures that engage the first and second pivot surfaces, respectively, when the door is in a closed position. The door closes off at least a substantial portion of the opening when the door is in the closed position. First and second magnetic connectors generate magnetic forces tending to retain engagement of the first and second pivot structures with the first and second pivot surfaces, respectively, whereby the door can be rotated about the first pivot structure in a first direction away from the closed position upon application of a force to the door sufficient to overcome the magnetic force of the second magnetic connector. The door can also be rotated about the second pivot structure away from the closed position upon application of a force to the door sufficient to overcome the magnetic force of the first magnetic connector. At least one edge of the door may be spaced-apart from an edge of the top adjacent the opening through the top to form a gap. Electrical cabling, data lines, or other utility lines may be routed from a utility space below the top through the gap to a location above the top to thereby interconnect electrically-powered items above the top to a power source below the top. The opening through the top may comprise an elongated rectangular opening, and the gap may comprise an elongated narrow opening.

Another aspect of the present invention is a work surface including a top having generally horizontal upper and lower side faces. The work surface also includes a structure below the top defining a utility space within the structure configured to receive electrical and/or data lines and/or electrical receptacles and other components. An opening through the top provides access to the utility space, and the opening defines first and second opposite side edges. A first pivot surface is positioned adjacent the first opposite side edge of the opening, and a second pivot surface is positioned adjacent the second opposite side edge of the opening. A cover member extends across at least a central portion of the opening when the cover member is disposed in a closed position. In the closed position, first and second opposite edge portions of the cover member are in closed positions. In the closed position, at least a portion of the first edge portion of the cover member is spaced-apart from the first side edge of the opening whereby utility lines can be routed from the utility space to a location above the top through the gap.

A first magnetic connector generates a magnetic force tending to retain the first opposite edge portion of the cover member in its closed position, and a second magnetic connector generates a magnetic force tending to retain the second opposite edge portion of the cover member in its closed position. A first retaining structure retains the cover member in a first open position wherein the cover member is rotated in a first direction relative to its closed position. The first open position provides access to the utility space through the central portion of the opening. A second retaining structure retains the cover member in a second open position, wherein the cover member is rotated in a second directions relative to its closed position. The second direction is not the same as the first direction, and the first direction may comprise a rotational direction that is opposite the first direction. The second open position also provides access to the utility space through the central portion of the opening.

These and other features, objects and advantages of the present invention will be further understood and appreciated by those skilled in the art by reference to the following specification, claims, and appended drawings.

BRIEF DESCRIPTION OF THE DRAWINGS

FIG. 11 is an isometric view of a work surface and grommet/door assembly according to yet another aspect of the present invention.

DETAILED DESCRIPTION OF THE PREFERRED EMBODIMENT

This application is related to copending U.S. Provisional Patent Application No. 61/349,672, entitled WORKWALL SYSTEM, the entire contents of which are incorporated herein by reference.

Figure 1:
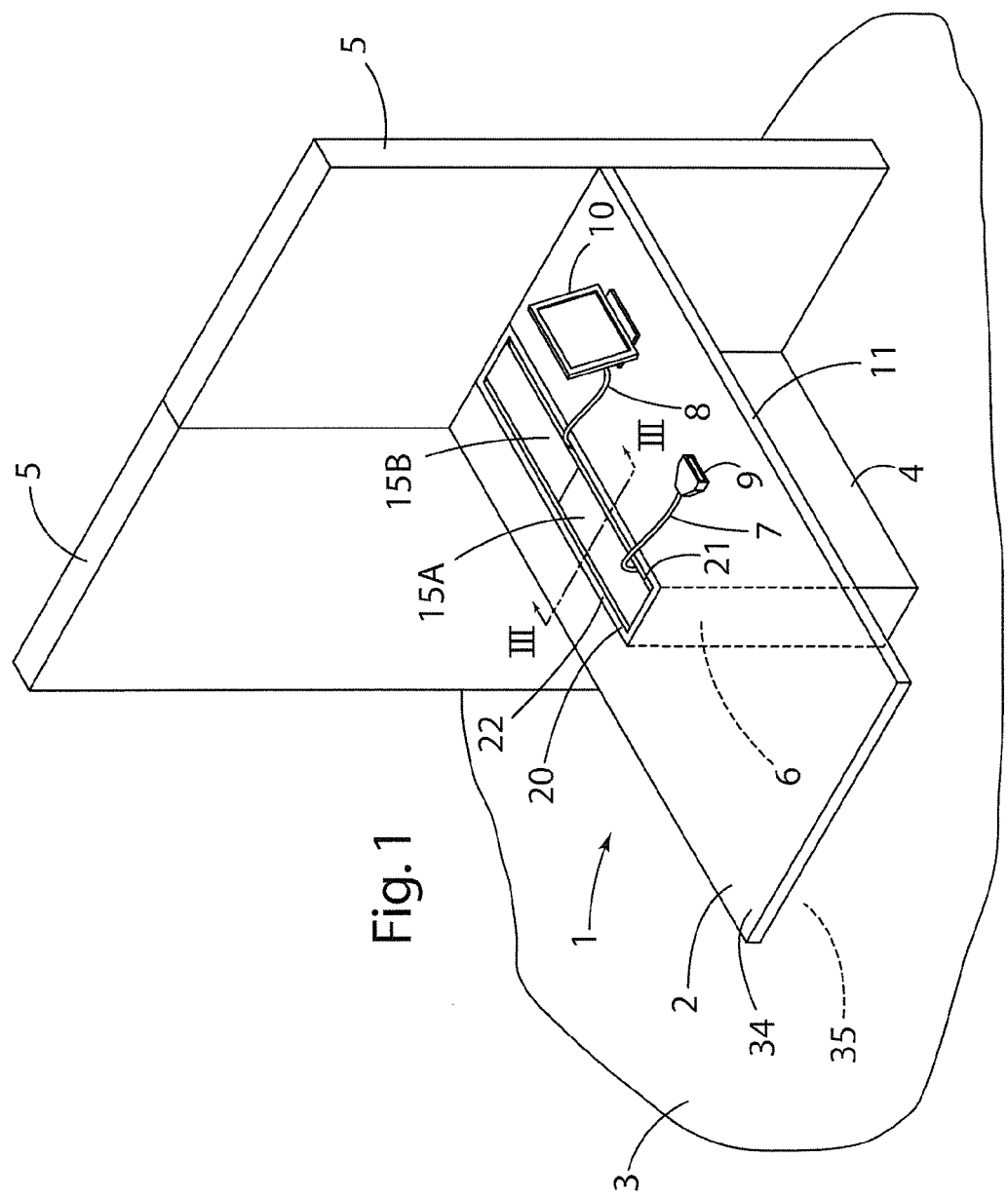
FIG. 1 is a partially fragmentary isometric view of a work surface and grommet/door assembly according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a work surface 1 according to the present invention may comprises a work surface top 2 that is positioned above a floor surface 3. In the illustrated example, the work surface top 2 is supported by a support structure 4 and a freestanding partition panel 5. However, the support structure 4 may include cabinet structures or the like such that work surface 1 comprises a freestanding desk. Alternately, as discussed in more detail below in connection with FIG. 11, work surface top 2 may be supported by legs or a pedestal such that the work surface 1 comprises a freestanding table. Still further, the work surface 1 may be solely supported by one or more partition panels 5. Partition panels 5 may comprise panels of the type described in detail in copending U.S. Provisional Patent Application No. 61/349,672, or the panels 5 may comprise known partition panels of the type used in office environments and the like.

Support structure 4 forms a utility space 6 below the work surface top 2. The utility space 6 provides for routing and/or storage of utility lines, such as electrical cables 7 and 8, that connect to an electrically-powered device 9, a display screen 10, or other electrically-powered devices. The utility space 6 may also provide for routing of data lines (not shown). The utility space 6 may be formed by a box-like support structure 4, or the utility space 6 may be formed by a utility trough or other suitable structures positioned below the work surface top 2.

Figure 2:
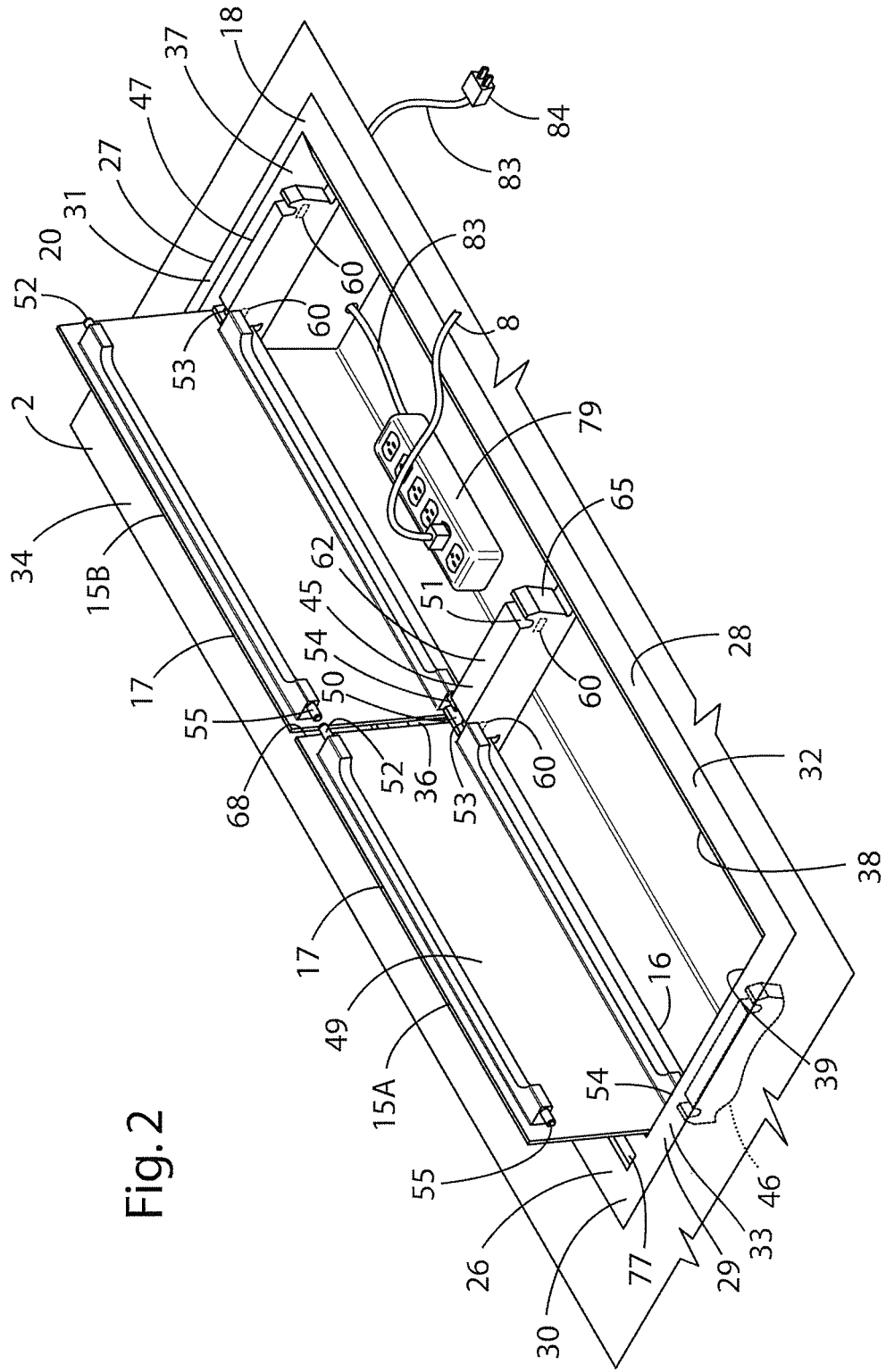
FIG. 2 is a fragmentary isometric view of a portion of the work surface and grommet/door assembly of FIG. 1.

An opening 20 (see also FIGS. 2 and 3) through work surface top 2 is at least partially closed off by one or more doors or cover members 15A, 15B. As discussed in more detail below, when doors 15A and 15B are in the closed position (FIGS. 1 and 3), gaps 21 and/or 22 may be formed along opposite side edges 16 and 17 of doors 15A and 15B to provide for routing of utility lines 7 and 8 from the utility space 6 below work surface top 2 to a location above the work surface top 2. Doors 15A and 15B can be rotated about two different axes in opposite rotational directions, or the doors 15A and 15B can be removed.

Figure 3:
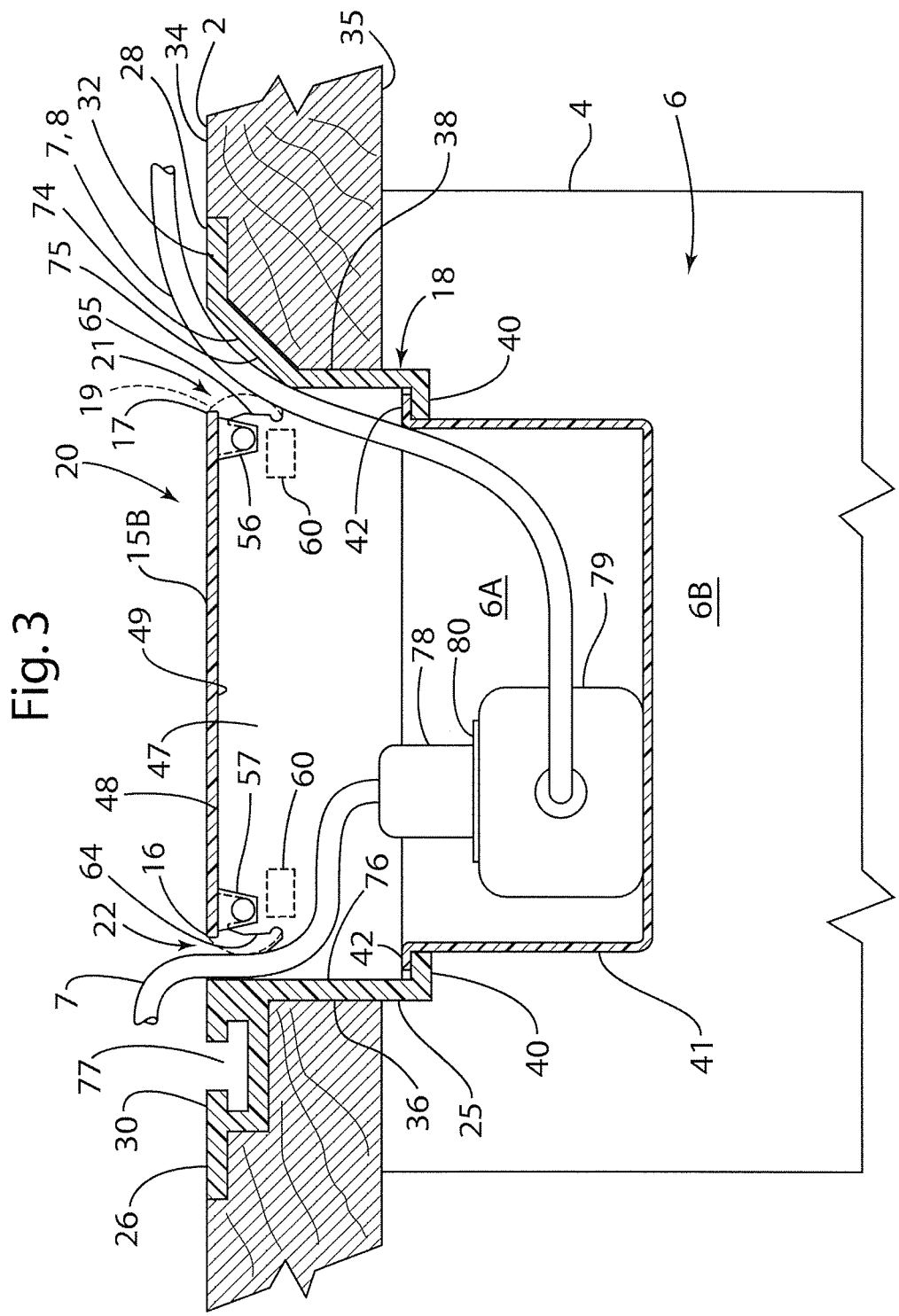
FIG. 3 is a cross-sectional view taken along line III-III of FIG. 1.

Referring again to FIGS. 2 and 3, a grommet/door assembly 18 is positioned in opening 20 through work surface top 2. The grommet/door assembly 18 includes a housing 25 having peripheral flanges 26-29 that extend outwardly from housing 25. Peripheral flanges 26-29 have upper surfaces 30-33, respectively, that are preferably flush with upper surface 34 of work surface top 2. The housing 25 also includes vertically-extending walls 36-39 that extend downwardly from flanges 26-29, respectively, around opening 20. Referring to FIG. 3, housing 25 also includes a lower flange 40 that extends inwardly from vertical walls 36-39. An outwardly extending flange 42 of a utility trough 41 rests on flange 40 to support utility trough member 41 on housing 25. The utility trough member 41 forms a first portion 6A of utility space 6 within utility trough member 41, and a second portion 6B of utility space 6 is formed within structure 4 outside of utility trough member 41. In the illustrated example, housing 25 comprises a one-piece member, and utility trough member 41 is a separate member that is supported by housing 25. However, utility trough member 41 may be integrally formed with housing 25, or it may be formed by support structure 4. Alternately, utility trough member 41 may be secured to a lower surface 35 of work surface top 2. In general, utility space 6 could be formed by a wide range of structures depending on the requirements of a particular application.

Figure 4:
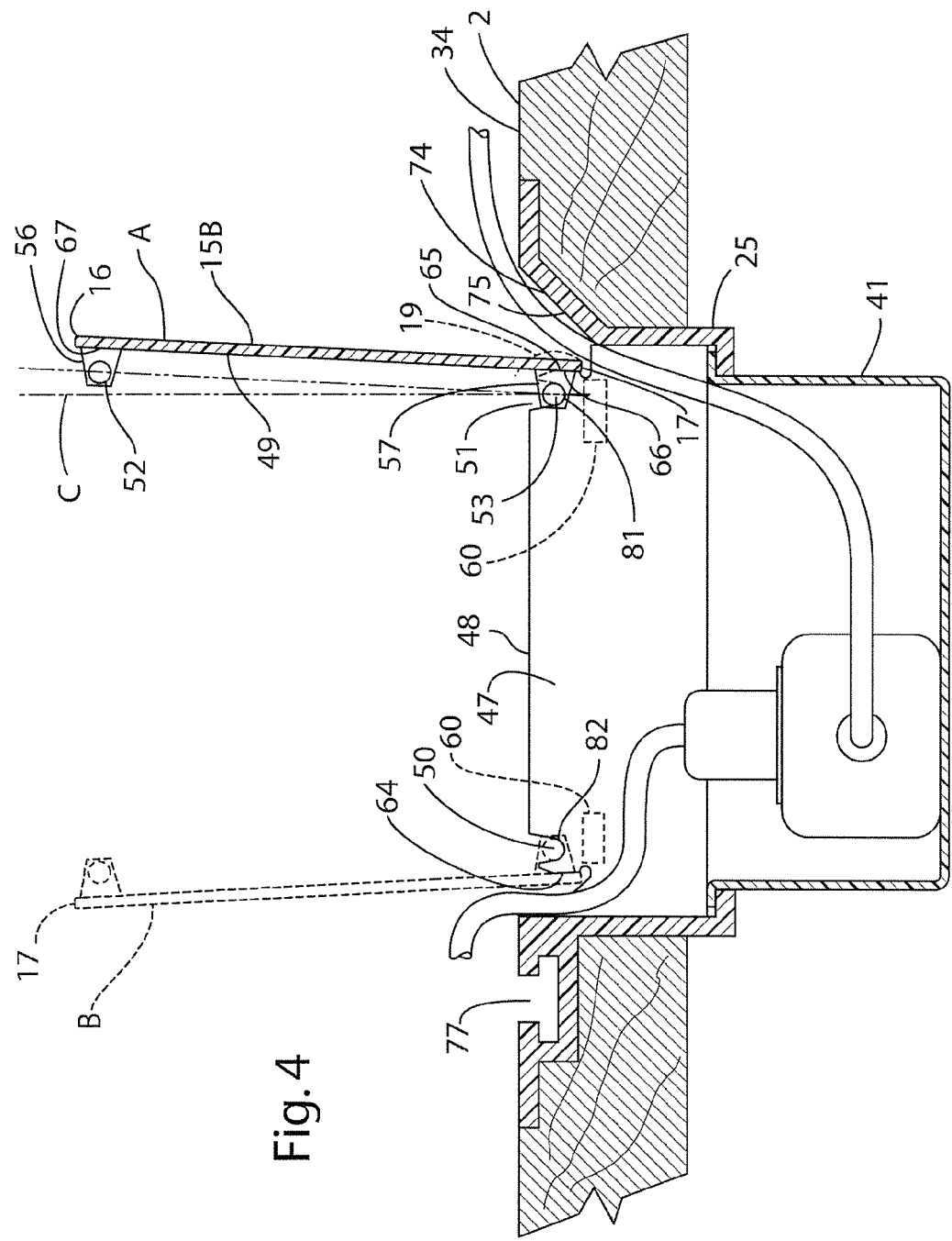
FIG. 4 is a cross-sectional view of the work surface and grommet/door assembly of FIG. 3, showing the door in first and second open positions.
Figure 5:
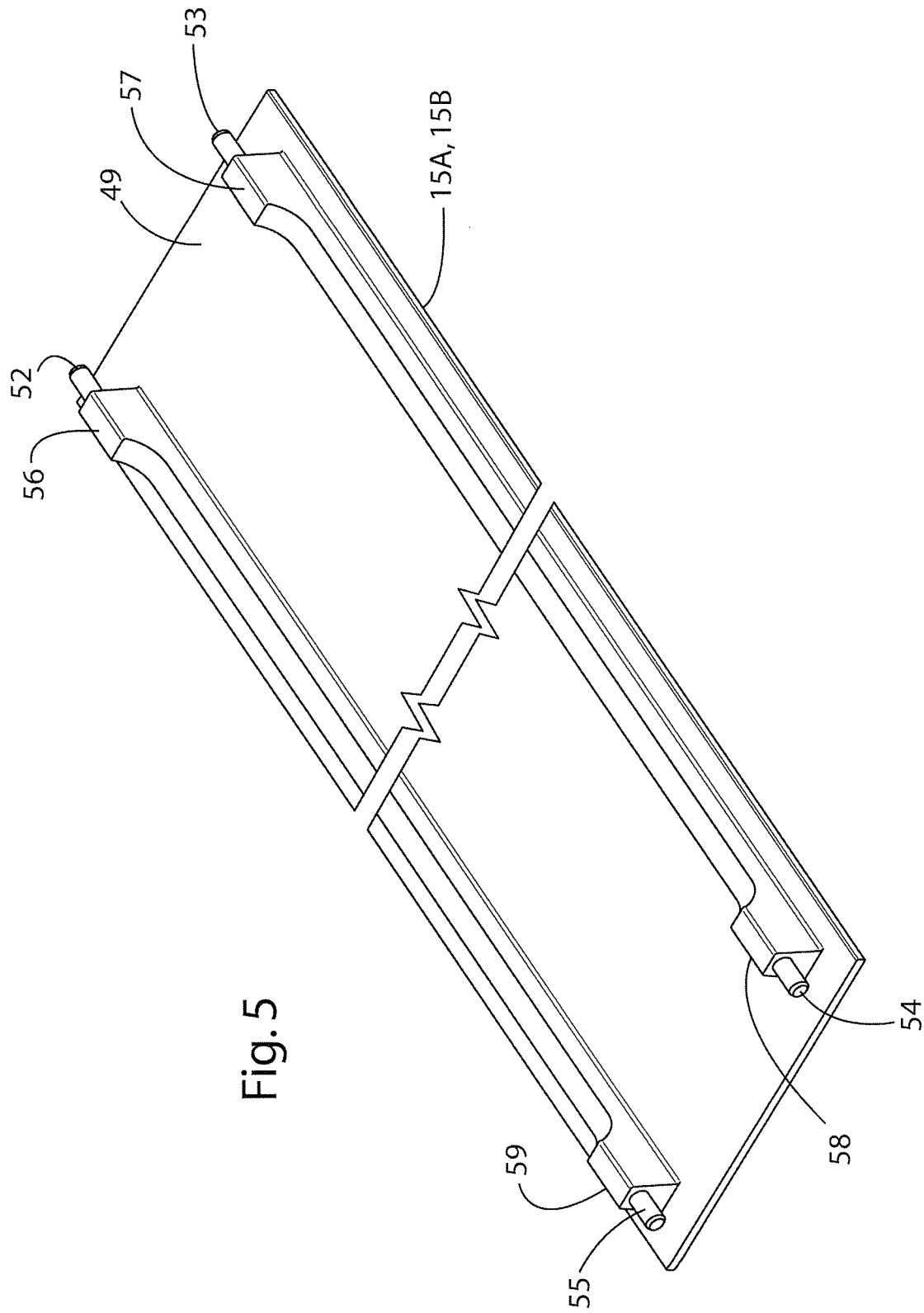
FIG. 5 is a fragmentary isometric view of the door of FIGS. 1-4, showing the underside of the door.

Door 15A is supported by a central support 45 and an end support 46, and door 15B is supported by central support 45 and end support 47. End support 46 is a mirror image of end support 47, and support 46 is therefore not described in detail herein. With reference to FIGS. 3 and 4, end support 47 includes an upper surface 48 that contacts lower surface 49 of door 15B when door 15B is in the closed position (FIG. 3). End support 47 also includes support surfaces in the form of upwardly opening grooves 50 an 51. Doors 15A and 15B include downwardly extending supports 56-59 (see also FIG. 5), and horizontally-extending pins 52-55 that form pivot structures. Magnets 60 are located in end support 47 directly adjacent and below grooves 50 and 51. Pins 52-55 are made of a ferromagnetic metal material that generates a magnetic attraction force when the pins 52-55 are located adjacent magnets 60. Pins 52-55 may also comprise magnets, and ferromagnetic material that is not magnetized could be utilized instead of magnets 60. Alternately, pins 52-55 and magnets 60 could be magnetized. End support 47 includes outwardly facing side surfaces 64 and 65 that engage edge portions 66 and 67, respectively, of lower surface 49 of door 15B to thereby retain door 15B in a first open position "A" or a second open position "B" (FIG. 4). Central support 45 has an upper surface contour that is substantially similar to end support 47, including an upper surface 62 and grooves 50 and 51. Central support 45 is wider than end supports 46 and 47 to provide for engagement with both doors 15A and 15B. Specifically, a first portion of upper surface 62 of central support 45 engages lower surface 49 of door 15A adjacent end 68 of door 15A, and a second portion of surface 62 also engages lower surface 49 of door 15B adjacent end 72 of door 15B when door 15B is in a closed position. Central support 45 also includes magnets 60 positioned adjacent the grooves 50 and 51. Central support 45 includes side surfaces 64 and 65 that engage lower surfaces 49 of doors 15A and 15B when doors 15A and 15B are in the open positions A and B. Thus, central support 45 is substantially similar to end supports 46 and 47, except that central support 45 is wider to accommodate a pair of side-by-side doors 15A and 15B. Doors 15A and 15B may comprise a polymer material (other than pins 52-55), wood, or other material. With the exception of pins 52-55, doors 15A and 15B are preferably made of a non-ferromagnetic material. Housing 25 and utility trough member 41 may be made of a polymer, metal, or other suitable material. Supports 45-47 preferably comprise polymer or other suitable non-ferromagnetic material.

Referring again to FIG. 3, side wall 38 of housing 25 of grommet/door assembly 18 may include an angled or sloped portion 74 that provides for routing of utility lines through gap 21. Side edge 17 of door 15B is preferably spaced-apart from surface 75 of angled wall portion 74 at least about ⅜ inch across, and more preferably at least about ½ inch across. The edge 17 of door 15B, angled wall 74, and the pivot location of door 15B are configured such that the minimum spacing between edge 17 and surface 75 during rotation of door 15B from the closed position (FIG. 3) to the open position A (FIG. 4) is not less than ⅜ inch, or more preferably at least about ½ inch (i.e., an arc 19 defined by edge 17 of door 15B is spaced apart from surface 75 not less than 3/8 inch, and the spacing is more preferably at least about ½ inch). Referring again to FIG. 3, inner surface 76 of side wall 36 of housing 25 extends substantially vertically at gap 22. Gap 22 is preferably at least about 3/8 inch across, and more preferably at least about ½ inch across to provide for routing of utility lines such as electric cable 7. However, edge 16 of the doors 15A and 15B could be positioned directly adjacent inner surface 76 of vertical wall 36 of housing 25 to substantially eliminate gap 22 if pass-through cable routing capability along edges of doors 15A and 15B is not required for a particular application. Cable 7 may comprise an electrical cable having a plug 78 that engages an electrical receptacle 80 of a multiple-receptacle power strip unit 79. The multiple-receptacle unit 79 may include a cord 83 (FIG. 2) having an electrical plug 84 to electrically connect the multiple-receptacle unit 79 to a conventional electrical power receptacle. Alternately, the multiple-receptacle unit 79 may comprise a power block of the type that is used to provide electrical power in freestanding office partition systems. If unit 79 comprises a power block of this type, it is connected to a modular power system of partition 5 (FIG. 1). Multiple-receptacle unit 79 may also comprise a conventional power block that is "hard wired" to a power supply of a building. In the illustrated example, power supply unit 79 includes an electrical cable 83 that is routed through an opening in housing 25. A plug 84 of cable 83 can be plugged into a conventional electrical outlet in a building. Cable 83 may also be routed through one of the gaps 21 or 22 rather than through an opening in housing 25 or trough 41. Also, multiple receptacle unit 79 may include receptacles configured to connect to data lines. Such connectors may be configured to connect to a telephone-type connector, or various ports of the type utilized to transfer data to and from computers and the like.

Grommet/door assembly 18 may include an optional T-slot 77 that extends parallel to gap 22. T-slot 77 may have substantially the same internal shape and configuration as known T-slots. For example, T-slot 77 may be substantially the same as a SOTO™ rail available from Steelcase, Inc. Various shelves, trays, lights, and other accessories may be mounted to the work surface utilizing T-shaped slot 77. As discussed above, housing 25 may comprise a one-piece polymer structure. However, if housing 25 includes an optional T-slot 77, housing 25 may be made of metal or other material having sufficient structural strength to support accessories mounted to T-slot 77. Alternately, the portion of housing 25 forming T-slot 77 may be made of a metal material, and the other portions of housing 25 may be made of a polymer material. If electrically powered accessories are mounted to T-shaped slot 77, such accessories will typically be located adjacent T-shaped slot 77 above gap 22. Because inner surface 76 of wall 36 of housing 25 is vertical in the region adjacent gap 22, cables 7 or other utility lines can be routed vertically through gap 22 to the accessory units located above and adjacent gap 22. In contrast, electrically powered accessories such as display screen 10 (FIG. 1) are typically positioned on upper surface 34 of work surface top 2 between gap 21 and front edge 11 of work surface top 2, and the lines running to these accessories are generally routed horizontally, directly adjacent surface 34 of work surface top 2. The angled or sloped wall portion 74 of side wall 38 (FIG. 3) provides for non-vertical routing of electrical cables and the like to thereby facilitate positioning of the electrical cables and/or other utility lines close to the surface 34 of work surface top 2.

In use, when doors 15A and 15B are in the closed position (FIG. 3), the magnetic attraction between pins 52-55 of doors 15A and 15B and the magnets 60 in supports 45, 46, and 47 retain the doors 15A and 15B in the closed position. To move the door 15B to the first open position A, a user pulls upwardly on side edge 16 of door 15B adjacent gap 22, pulling with sufficient force to overcome the magnetic attraction between pins 52, 55 and adjacent magnets 60 in supports 45 and 47. Door 15B can then be rotated in a first direction to the open position A about pivot axis 81. In the open position, the lower surface 49 of door 15B adjacent edge 17 contacts side surfaces 65 of central support 45 and end support 47, thereby retaining the door 15B in the open position. The center of gravity of door 15B is preferably spaced to the outside of a vertical plane "C" passing through pivot axis 81, such that the gravitational forces acting on door 15B retain it in the first open position A. The side or stop surfaces 64 and 65 of supports 45-47 are preferably planar, and face outwardly, and slightly downwardly at the same angle as surface 49 of door 15B when door 15B is in the open position A. However, surfaces 64 and 65 could have other shapes/configurations.

Door 15B can be rotated to a second open position B (FIG. 4) by application of a upward force to edge 17 of door 15B to thereby rotate door 15B about a second axis 82 formed by pins 53 and 54 and grooves 50 of supports 45 and 47. Door 15A can also be rotated in two opposite directions about two different axes to two different open positions A and B in substantially the same manner as shown in FIG. 4 for door 15B. Also, work surface 1 may include a single door 15A or it may include three or more doors as required for a particular application.

Figure 6:
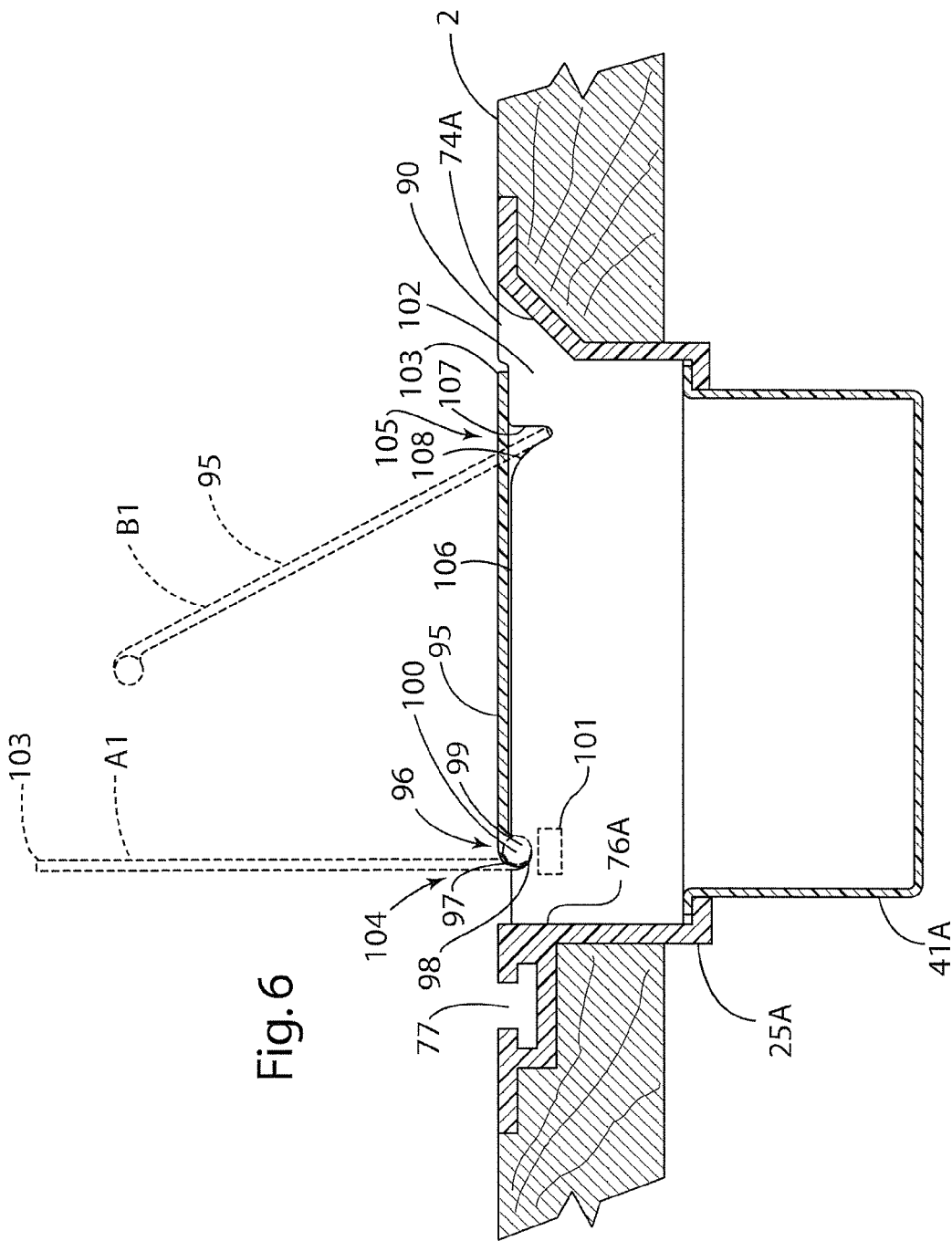
FIG. 6 is a fragmentary cross-sectional view of a work surface and grommet/door assembly according to another aspect of the present invention.

With further reference to FIG. 6, a door 95 and support 90 according to another aspect of the present invention may be utilized in conjunction with a housing 25A that is substantially similar to the housing 25 described above. Edge 96 of door 95 has a cylindrical outer surface 97 that engages a cylindrical surface 98 of an upwardly opening groove 99 formed in support 90. A metal insert 100 is disposed at edge 96, and a magnet 101 of support 90 is positioned directly adjacent groove 99. An opening or gap 102 is formed between edge 103 of door 95 and angled side wall 74A of housing 25A, and an opening or gap 104 is formed between edge 96 of door 95 and inner side wall surface 74A of housing 25A. In use, an upward force can be applied to edge 103 of door 95 to thereby rotate the door 95 to a first open position "A1". The magnetic force between metal insert 100 and magnet 101 helps retain door 95 in open position A1. A V-shaped groove or notch 105 in upper surface 106 of support 90 includes a first surface 107 that is substantially vertical, and a second surface 108 that extends at an angle, and faces upwardly and sidewardly. Door 95 can be supported in a second open position "B1" by positioning edge 103 of door 95 in V-shaped groove 105. Door 95 may be moved from the closed position to the second open position B1 by applying an upward force to edge 96 of door 95 to overcome the magnetic force between metal insert 100 and magnet 101, followed by positioning of edge 103 of door 95 in V-shaped groove 105. Support 90 may be located at end positions of opening 20 in substantially the same manner as end supports 46 and 47 described in more detail above. One or more supports 90 may also be placed at central positions along opening 20 if work surface 1 includes a plurality of doors 95 in a manner that is similar to central support 45.

Figure 7:
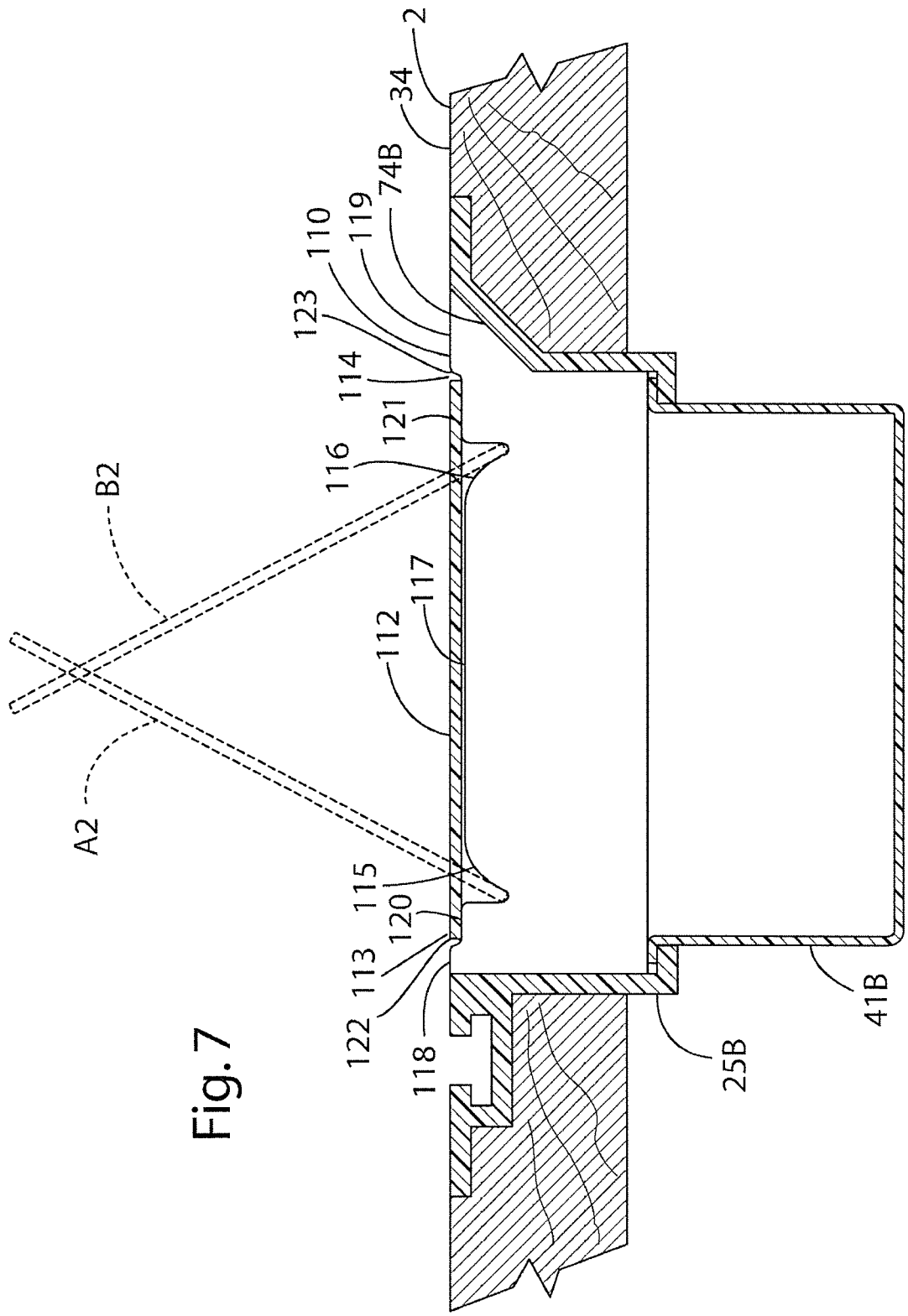
FIG. 7 is a fragmentary cross-sectional view of a work surface and grommet/door assembly according to another aspect of the present invention.

With further reference to FIG. 7, a door 112 and support 110 according to another aspect of the present invention may be utilized in conjunction with a housing 25B that is substantially the same as housing 25 described above. Support 110 includes V-grooves 115 and 116 that are mirror images of one another. V-groove 116 is substantially the same as V-groove 105 described above in connection with FIG. 6. Edges 113 and 114 of door 112 may be positioned in V-grooves 115 and 116 to support door 112 in first and second open positions "A2" and "B2", respectively. Support 110 includes upper surfaces 118 and 119 that are at substantially the same height as upper surface 34 of work surface top 2, and upper support surfaces 117, 120, and 121 that support door 112 when it is in the closed or horizontal position. Surface 122 of support 110 extends between surfaces 118 and 120, and surface 123 extends between surfaces 119 and 121 of support 110. The surfaces 122 and 123 retain door 112 in the closed position.

Figure 8:
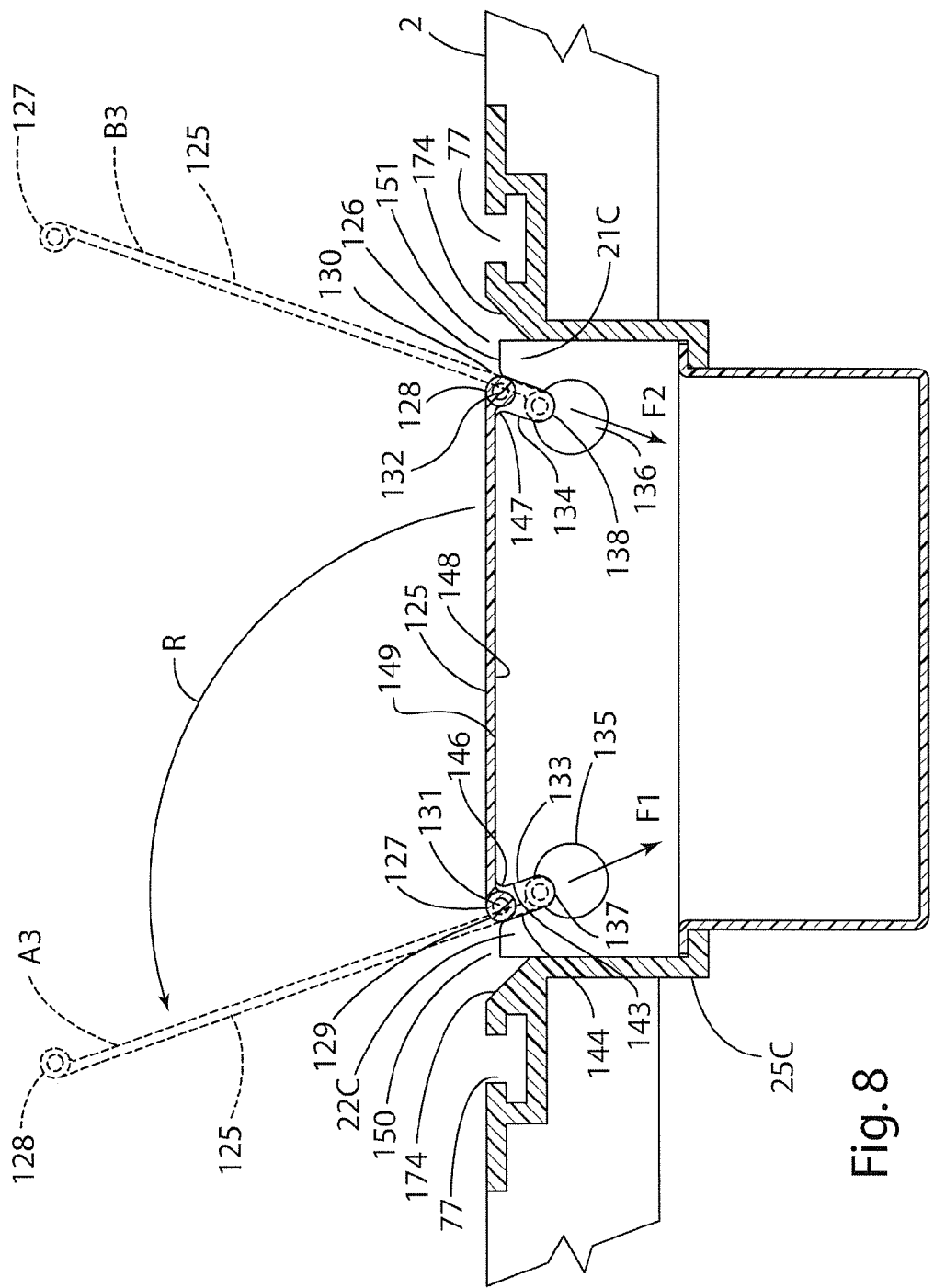
FIG. 8 is a fragmentary cross-sectional view of a work surface and grommet/door assembly according to another aspect of the present invention.

With further reference to FIG. 8, a door 125 and support 126 may be utilized in a work surface 1 according to another aspect of the present invention. Door 125 includes opposite edge portions 127 and 128 having cylindrical outer surface portions 129 and 130, respectively. Magnets 131 and 132 are positioned in the door at edges 127 and 128. Support 126 comprises a vertical plate-like wall or web having channels or slots 133 and 134. Magnets 135 and 136 are positioned in support 126 adjacent lower ends 137 and 138 of channels or slots 133 and 134, respectively. Housing 25C includes two T-slots 77 and angled portions 74 adjacent gaps 21C and 22C.

Figure 9:
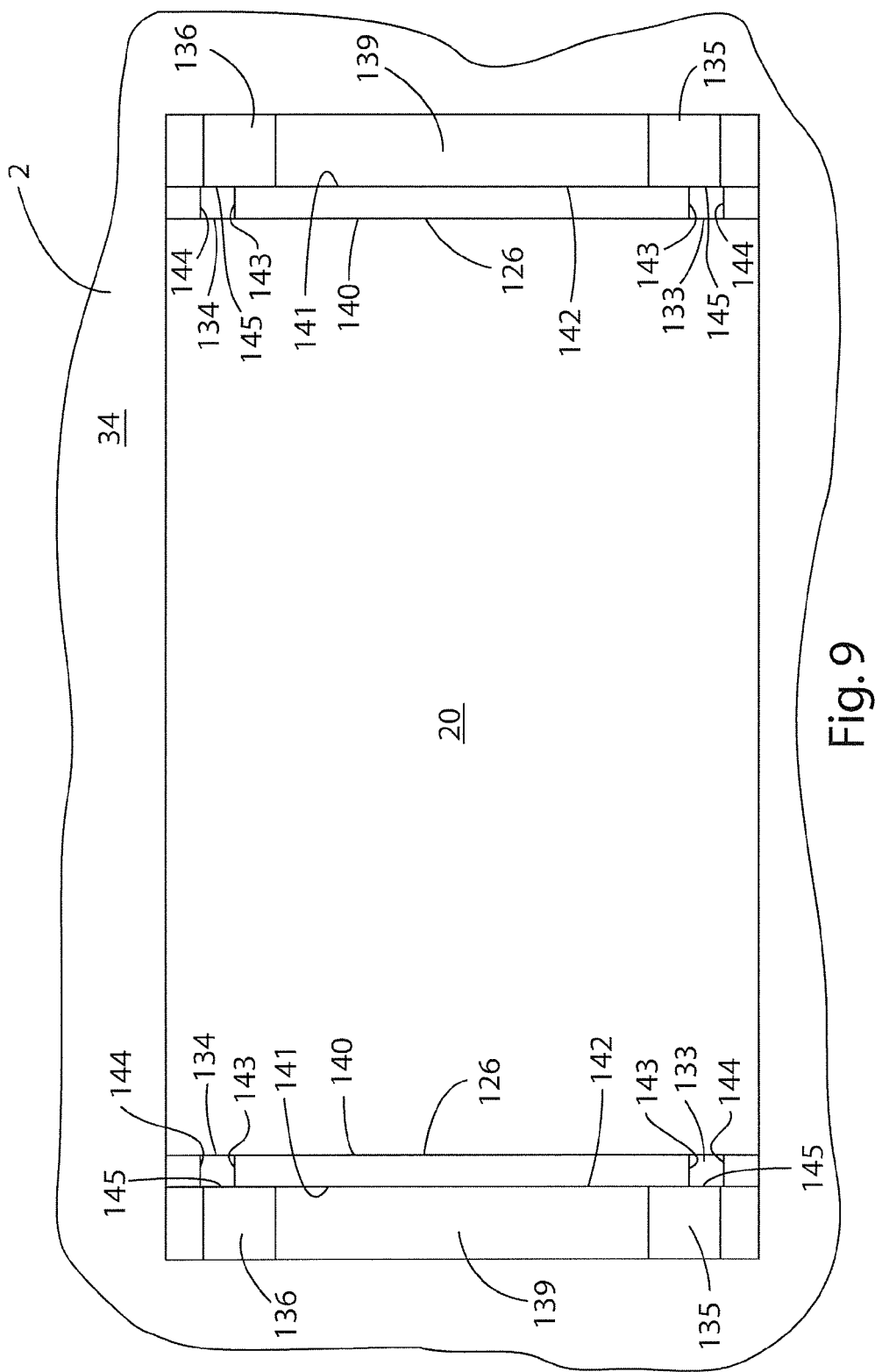
FIG. 9 is a top plan view of the work surface and grommet/door assembly of FIG. 8.

With further reference to FIG. 9, supports 126 include vertical inner surfaces 140 that face opening 120, and outer surfaces 141 that abut an inner surface 142 of end plates 139. Magnets 135 and 136 may comprise cylindrically-shaped magnets that are mounted in the end plates 139 with opposite ends of the magnets being flush with surfaces 140 and 141. Channels 133 and 134 include opposite side surfaces 143 and 144, and a base surface 145. The channels or slots 133 and 134 open toward opening 20 through top 2. Door 125 preferably has a rectangular shape in plan view, with straight side opposite side edges (not shown) that extend between cylindrical outer surface portions 129 and 130. When door 125 is in one of the two open positions A3 or B3, a pair of the corners of the door 125 are disposed in channels 133 and 134.

Referring again to FIG. 8, when door 125 is in the closed or horizontal position, edge portion 127 of door 125 is spaced upwardly from magnet 135, and edge portion 128 of door 125 is spaced upwardly from magnet 136. Magnets 135 and 136 generate magnetic forces "F1" and "F2" acting on opposite edge portions 127 and 128, respectively, of door 125.

In use, door 125 can be moved to a first open position "A3" by applying an upward force on edge portion 128 that is sufficient to overcome the magnetic attraction force F2 and move edge portion 128 upwardly. As edge 128 moves upwardly, door 125 rotates about edge or corner 146 formed by side surface 143 of groove or channel 133 and horizontal upper surface 149. As door 125 rotates about edge or corner 146, edge portion 127 of door 125 moves downwardly within channel 133. The magnetic force F1 acting on edge portion 127 generates a moment about corner 146 tending to move door 125 from the closed position to the first open position A3. As door 125 rotates toward first open position A3, the magnetic force F2 is reduced, and magnetic force F1 increases.

If magnetic force F1 is sufficiently large, it will cause door 125 to move from a partially open position to the first open position A3 without application of additional force to door 125 by a user. For example, magnets 131, 132, 135, and 136 can be selected to provide sufficiently large forces F1 and F2 to cause door 125 to open if door 125 is initially moved by a user to an intermediate position of, for example, 10° or 20°. As door 125 moves from the closed position to the first open position A3, edge portion 127 of door 125 moves downwardly within slot or channel 133 toward magnet 135 until cylindrical outer surface 129 of edge portion 127 contacts lower end surface 137 of channel or slot 133. The magnetic force F1 retains door 125 in the first open position A3, with the upper surface of door 126 in contact with the side surface 144 of channel 133. Door 125 can be moved from the first open position A3 to the closed position by applying an inwardly directed force to edge portion 128 of door 125, thereby rotating door 125 in a direction opposite the arrow "R". Application of a closing force to edge portion 128 of door 125 causes cylindrical outer surface 129 of edge portion 127 to slide alongside surface 144 of channel 133, while lower surface 148 of door 125 simultaneously slides along corner 146 of support 126. Thus, edge portion 127 of door 125 rotates and translates as door 125 is moved from the first open position A3 to the closed position.

Door 125 may be moved to a second open position "B3" from a closed position in the same manner as just described with respect to moving door 125 to the first open position A3. To move door 125 to the second open position B3, a user initially applies an upward force to edge portion 127. Door 125 can also be moved from second open position B3 to the closed position by applying a horizontal/inward force to edge portion 127. Forces F 1 and F2 are equal or approximately equal, such that the forces F1 and F2 tend to retain door 125 in the closed position. Cylindrical outer surfaces 129 and 130 of edge portions 127 and 128, respectively, of door 125 are preferably spaced-apart from the housing 25C to form gaps 150 and 151 for routing utility lines from below work surface top 2 to a position above work surface top 2. However, edge portions 127 and 128 may be positioned directly adjacent the side walls of housing 25C to form a single gap for routing of utility lines or to provide an arrangement that does not include a gap. Housing 25C may include a pair of T-slots 77. However, the T-slots 77 are optional, and housing 25C may be configured without T-slots 77.

Figure 10:
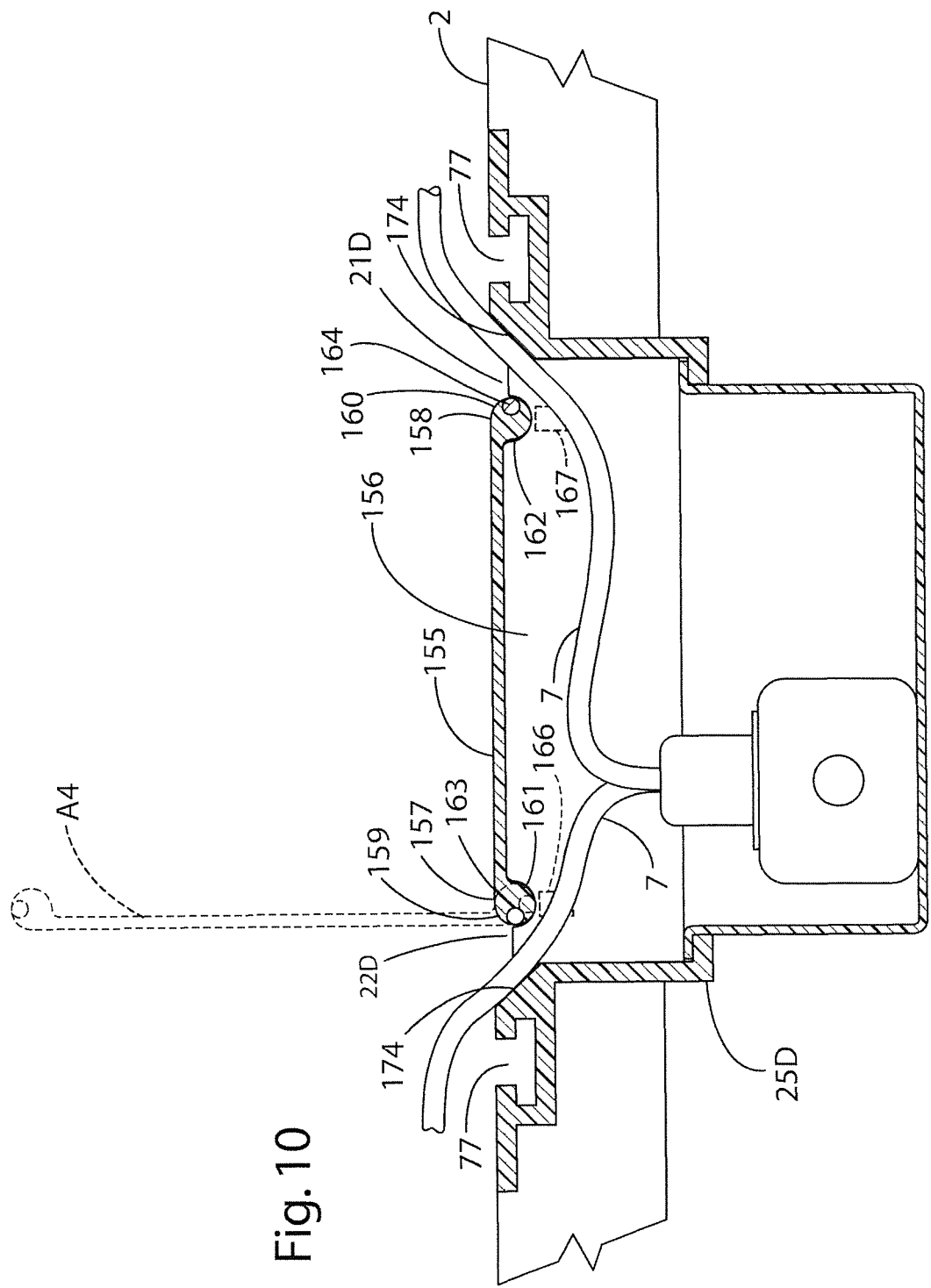
FIG. 10 is a fragmentary cross-sectional view of a work surface and grommet/door assembly according to another aspect of the present invention.

With reference to FIG. 10, a work surface 1 according to another aspect of the present invention includes a door 155 and a support 156. Door 155 includes opposite edges 157 and 158 having cylindrical outer surfaces 159 and 160, respectively, that engage cylindrical notches or grooves 161 and 162, respectively, of support 156. Magnets or metal pieces 163 and 164 are positioned in edge portions 157 and 158 of door 155. The magnets or metal pieces 163 and 164 are located off center relative to cylindrical surfaces 159 and 160 of edge portions 157 and 158 of door 155, very close to cylindrical surfaces 159 and 160. As door 155 is pivoted to a first open position "A4" about edge 157 and notch 161, magnet or metal piece 163 moves closer to a magnet 166 positioned in support 156. The magnetic force thereby includes a component tending to rotate door 155 to the vertical, open position A4 if the door 155 is rotated either clockwise or counterclockwise relative to the vertical or open position A4. Thus, the magnetic force tends to retain the door 155 in the open position A4. Similarly, door 155 can be rotated about opposite edge 158 to a second vertical open position (not shown), and the magnetic force generated by magnet or metal piece 164 and magnet 167 tends to retain door 155 in the second open position. Edge portions 157 and 158 of door 155 may be spaced-apart from angled side walls 174 of housing 25D to form optional gaps 21D and 22D for routing utility lines 7.

With further reference to FIG. 11, a work surface 180 according to another aspect of the present invention comprises a conference table 181 having a table top 182 that is supported by leg structures 183. First and second elongated openings 184 and 185 extend through table top 182, and a plurality of doors 15 selectively close off portions of openings 184 and 185. Grommet assemblies 188 are mounted in the openings 184 and 185 to support the doors 15 for rotation in opposite directions to first and second open positions. The doors 15 and grommet assembly 188 may have one of the configurations described above in connection with FIGS. 1-10. In a preferred embodiment, work surface 180 does not include T-slots 77, and the doors 15 covering opening 184 form a single gap 186, and doors covering opening 185 form a single gap 187. The housing of grommet assembly 188 may include a ramped surface, such that gaps 186 and 187 have a configuration that is substantially similar to gap 21 illustrated in FIG. 3.

It will be understood that the various versions or embodiments of the doors described above in connection with FIGS. 1-11 could include various combinations or variations of the features described above. For example, each of the doors may have a single gap for routing of utility lines from below the worksurface to an area above the worksurface, or gaps could be provided along each opposite side edge of the door. Similarly, angled surfaces (e.g., surface 75, FIG. 3) could be provided along each gap, or vertical surfaces (e.g., surface 76, FIG. 3) could be provided adjacent each gap. If one or both of the opposite side edges of the door are positioned directly adjacent the housing such that no gap is formed, the housing could have a vertical inner surface adjacent one or both edges of the door. As described above, the utility troughs (e.g., utility trough 41, FIG. 3) may be utilized to provide for routing of utility lines. Alternately, the utility troughs may be configured to provide storage space such as a storage cubby or pencil cup below the worksurface in a readily accessible manner. Also, the grommet assemblies may be utilized in connection with media connection systems. For example, a media:scape system of the type that is commercially available from Steelcase Inc. of Grand Rapids, Mich. may be positioned in the housing and utility trough to thereby provide a "media well." The "pucks" of the media:scape system may also be stored in the housing and utility trough, and pulled out as required, with the cables of the "pucks" being routed through a gap adjacent an edge of a door.

The various grommet/door assemblies described above may also be utilized in a storage unit. For example, a power block could be positioned at the back of a storage unit (e.g., behind the drawers or shelves), and the grommet/door assembly could be positioned to provide access to the power block to plug in electrical equipment at a location that is away from a primary worksurface.

Also, the pivotable/removable doors and magnetic retainers could be utilized in a vertical orientation. For example, the pivotable/removable doors and grommets could be utilized to cover a horizontally-extending raceway in a partition panel. Raceways of this type may be positioned at a worksurface height, and may include an internal space or channel that extends horizontally to accommodate horizontal routing of power and data lines or other utility lines. A multi-outlet receptacle unit, power block, or other connectors may be positioned in the raceway, and the doors may be utilized to selectively close off the outwardly-facing open side of the raceway of the partition panel. When configured in this way, the supports (e.g., supports 45-47) are positioned with the door support surfaces (e.g., surface 62, FIG. 2) in a vertical orientation.

It will become apparent to those skilled in the art that various modifications to the preferred embodiment of the invention as described herein can be made without departing from the spirit or scope of the invention as defined by the appended claims.

The invention claimed is:

1. A work surface comprising:
a top having upper and lower side faces, the top defining an opening extending between the upper and lower side faces, and first and second horizontally spaced-apart pivot surfaces;
a door including spaced-apart first and second pivot structures that engage the first and second pivot surfaces, respectively, when the door is in a closed position, and wherein the door closes off at least a substantial portion of the opening when it is in the closed position;
first and second magnetic connectors that generate magnetic forces tending to retain engagement of the first and second pivot structures with the first and second pivot surfaces, respectively, whereby the door can be rotated about the first pivot structure in a first direction away from the closed position upon application of a force to the door sufficient to overcome the magnetic force of the second magnetic connector, and the door can be rotated about the second pivot structure away from the closed position upon application of a force to the door sufficient to overcome the magnetic force of the first magnetic connector; and wherein:
first and second retaining surfaces that retain the door in the first and second open positions;
the door is movable to first and second open positions wherein the door is rotated in first and second directions, respectively, relative to the closed position;
the first and second pivot structures comprise first and second pins comprising a ferromagnetic material, and the pivot surfaces comprise upwardly-opening first and second grooves that receive the first and second metal pins, respectively; and
the first and second magnetic connectors comprise magnets positioned adjacent the first and second grooves to releasably retain the pins in the grooves.

2. The work surface of claim 1, wherein:
the door has a generally rectangular perimeter and an upper surface that is disposed substantially flush with the upper side face of the top.

3. The work surface of claim 2, wherein:
the perimeter of the door includes spaced-apart first and second opposite side edges; and
the first and second pins are positioned inwardly relative to the first and second opposite side edges.

4. The work surface of claim 3, wherein:
the top includes a first edge portion extending along the opening, and wherein the first opposite side edge of the door is spaced-apart from the first edge of the top to form a gap whereby electrical lines can be routed through the gap.

5. The work surface of claim 4, wherein:
at least a portion of the gap has a dimension of at least about ⅜ inch.

6. The work surface of claim 5, wherein:
the first edge portion and the first perimeter portion are substantially linear.

7. The work surface of claim 6, wherein:
the first edge portion comprises an angled surface that faces upwardly and inwardly toward the door.

8. The work surface of claim 7, wherein:
the angled surface is substantially planar.

9. The work surface of claim 7, wherein:
the gap comprises a first gap; and
the top includes a second edge portion extending along an opposite side of the opening relative to the first edge portion, and wherein the second edge portion includes a vertical surface that is horizontally spaced-apart from the second opposite side edge of the door at least about ⅜ inch.

10. A work surface comprising:

a top having upper and lower side faces, the top defining an opening extending between the upper and lower side faces, and first and second horizontally spaced-apart pivot surfaces;

a door including spaced-apart first and second pivot structures that engage the first and second pivot surfaces, respectively, when the door is in a closed position, and wherein the door closes off at least a substantial portion of the opening when it is in the closed position;

first and second magnetic connectors that generate magnetic forces tending to retain engagement of the first and second pivot structures with the first and second pivot surfaces, respectively, whereby the door can be rotated about the first pivot structure in a first direction away from the closed position upon application of a force to the door sufficient to overcome the magnetic force of the second magnetic connector, and the door can be rotated about the second pivot structure away from the closed position upon application of a force to the door sufficient to overcome the magnetic force of the first magnetic connector; and wherein:

the first magnetic connector generates a force tending to pivot the door about the first pivot structure in a first direction toward an open position away from the closed position, and the second magnetic connector generates a force tending to retain the door in the closed position when the door is in the closed position.

11. The work surface of claim 10, wherein:
the top includes retaining surfaces that retain the door in the open position.

12. The work surface of claim 11, wherein:
the door pivots and translates as it moves from the closed position to the open position.

13. The work surface of claim 12, wherein:
the door initially pivots as it begins to move from the closed position to the open position and translates linearly immediately prior to reaching the open position.

14. The work surface of claim 13, wherein:
the retaining surfaces comprise first and second surfaces that face one another and define a space therebetween that receives a portion of the door when the door is in the open position.

15. The work surface of claim 14, wherein:
the retaining surfaces comprise side walls of a first channel adjacent a first end of the opening wherein the first channel opens sidewardly toward the opening;
the retaining surfaces further comprising a second channel adjacent a second end of the opening, the second channel opening sidewardly toward the opening; and
wherein the door defines a generally quadrilateral perimeter with first and second corner portions that are disposed in the first and second channels when the door is in the open position.

16. The work surface of claim 15, wherein:
the first and second channels define a lower portion; and
wherein the first and second magnetic connectors comprise magnets disposed adjacent the lower ends of the first and second channels that generate a magnetic force tending to pull the first and second corner portions of the door downwardly towards the lower ends of the channels.

17. The work surface of claim 16, wherein:
the first and second channels extend linearly.

18. The work surface of claim 17, wherein:
the first and second channels extend non-vertically such that the door is retained in a non-vertical upright orientation when the door is in the open position.

19. A work surface, comprising:

a top having upper and lower opposite side faces;

a structure below the top defining a utility space within the structure that is configured to receive utility lines therein;

an opening through the top that provides access to the utility space, the opening defining first and second opposite side edges;

a first pivot surface positioned adjacent the first opposite side edge of the opening;

a second pivot surface positioned adjacent the second opposite side edge of the opening;

a cover member extending across at least a central portion of the opening when the cover member is disposed in a closed position, and wherein first and second opposite edge portions of the cover member are in closed positions when the cover member is in its closed position, and wherein at least a portion of the first edge portion of the cover member is spaced-apart from the first side edge of the opening when the cover member is in the closed position to define at least one gap to permit routing of utility lines from the utility space through the gap to a location above the top;

a first magnetic connector generating a magnetic force tending to retain the first opposite edge portion of the cover member in its closed position;

a second magnetic connector generating a magnetic force tending to retain the second opposite edge portion of the cover member in its closed position;

a first retaining structure configured to retain the cover member in a first open position wherein the cover member is rotated in a first direction relative to its closed position, the first open position providing access to the utility space through the central portion of the opening;

a second retaining structure configured to retain the cover member in a second open position wherein the cover member is rotated in a second direction relative to its closed position, wherein the second direction is not the same as the first direction, and wherein the second open position provides access to the utility space through the central portion of the opening;

the first and second retaining structures comprise oppositely facing stop surfaces that contact lower surfaces of the cover member when the cover member is in the first and second open positions; and the oppositely facing stop surfaces are substantially planar, and face downwardly and sidewardly.

20. A work surface, comprising:

a top having upper and lower opposite side faces;

a structure below the top defining a utility space within the structure that is configured to receive utility lines therein;

an opening through the top that provides access to the utility space, the opening defining first and second opposite side edges;

a first pivot surface positioned adjacent the first opposite side edge of the opening;

a second pivot surface positioned adjacent the second opposite side edge of the opening;

a cover member extending across at least a central portion of the opening when the cover member is disposed in a closed position, and wherein first and second opposite edge portions of the cover member are in closed positions when the cover member is in its closed position, and wherein at least a portion of the first edge portion of the cover member is spaced-apart from the first side edge of the opening when the cover member is in the closed position to define at least one gap to permit routing of utility lines from the utility space through the gap to a location above the top;

a first magnetic connector generating a magnetic force tending to retain the first opposite edge portion of the cover member in its closed position;

a second magnetic connector generating a magnetic force tending to retain the second opposite edge portion of the cover member in its closed position;

a first retaining structure configured to retain the cover member in a first open position wherein the cover member is rotated in a first direction relative to its closed position, the first open position providing access to the utility space through the central portion of the opening; and a second retaining structure configured to retain the cover member in a second open position wherein the cover member is rotated in a second direction relative to its closed position, wherein the second direction is not the same as the first direction, and wherein the second open position provides access to the utility space through the central portion of the opening;

the cover member has a perimeter that is generally quadrilateral with four corners;

the first magnetic connector comprising a first pair of magnets positioned adjacent a first pair of the corners when the cover member is in the closed position; and the second magnetic connector comprising a second pair of magnets positioned adjacent a second pair of the corners when the cover member is in the closed position.

21. The work surface of claim 20, wherein:
the first and second pivot surfaces comprise upwardly-opening grooves; and
the cover member includes first and second metal pins that rotatably engage the upwardly-opening grooves.

22. A work surface comprising:
a top having upper and lower side faces, the top defining an upwardly facing opening extending between the upper and lower side faces, and first and second horizontally spaced-apart engagement surfaces;
a door including spaced-apart first and second engagement structures that engage the first and second engagement surfaces, respectively, when the door is in a closed position, and wherein the door closes off at least a substantial portion of the upwardly facing opening when it is in the closed position;
at least a first magnetic connector that generates a magnetic force tending to retain engagement of the first engagement structure with the first engagement surface, whereby the door can be rotated upwardly about the first engagement structure in a first direction to a first open position upon application of a force to the door, and the door can be moved from the closed position to a second open position upon application of a force to the door sufficient to overcome the magnetic force of the first magnetic connector,
wherein:
the second engagement surface comprises a V-shaped groove; and
the second engagement structure comprises an edge of the door that is received in the V-shaped groove when the door is disposed in the second open position.

23. A work surface comprising:
a top having an upwardly facing upper side face and a lower side face, the top defining an upwardly facing opening extending between the upper and lower side faces, the opening defining spaced apart first and second opposite side edges, and first and second horizontally spaced-apart engagement surfaces positioned adjacent the first and second side edges respectively, wherein the top includes first and second pairs of upwardly-opening grooves and the first and second horizontally spaced apart engagement surfaces are separate from the upwardly-opening grooves;
a door that closes off at least a substantial portion of the upwardly facing opening when it is in a closed position, and wherein the door is configured to be moved from the closed position to a first open position wherein the door engages the first pair of upwardly-opening grooves and the first engagement surface with the first engagement surface retaining the door in a first generally upright position adjacent the first side edge, and wherein the door is configured to be moved from the closed position to a second open position wherein the door engages the secondly pair of upwardly-opening grooves and the second engagement surface with the second engagement surface retaining the door in a second generally upright position adjacent the second side edge, whereby the door is configured to alternately open along either of the first and second pairs of upwardly-opening grooves.

24. The work surface of claim 23, including:
first and second magnetic connectors that generate magnetic forces tending to retain engagement of the door with the first and second engagement surfaces, whereby the door can be rotated in a first direction away from the closed position upon application of a force to the door sufficient to overcome the magnetic force of the second magnetic connector, and the door can be rotated in a second direction away from the closed position upon application of a force to the door sufficient to overcome the magnetic force of the first magnetic connector.

25. The work surface of claim 23, wherein:
the top includes a magnet disposed adjacent each of the grooves;
the first and second pairs of pins comprise metal that is magnetically attracted to the magnets.

* * * * *